G. MARSHMAN.
SHUTTER AND BLIND-FASTENERS.
No. 194,255. Patented Aug. 14, 1877.
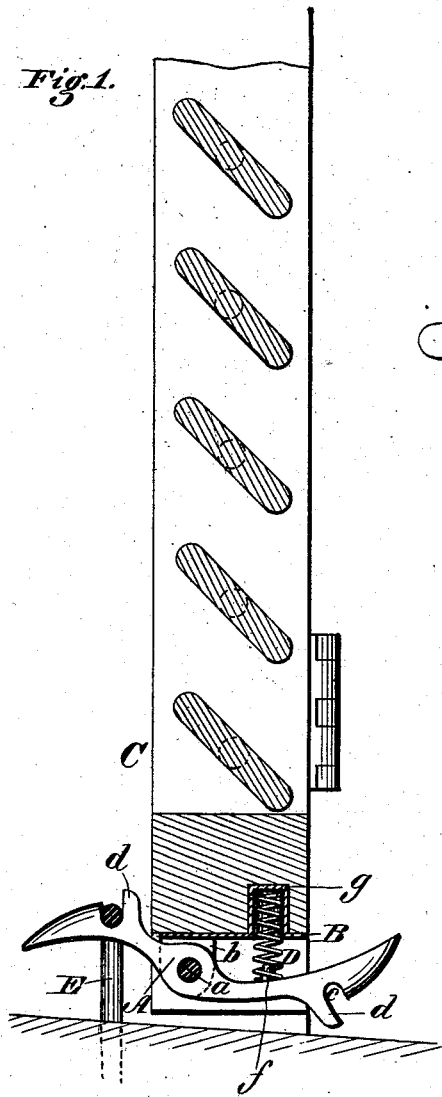
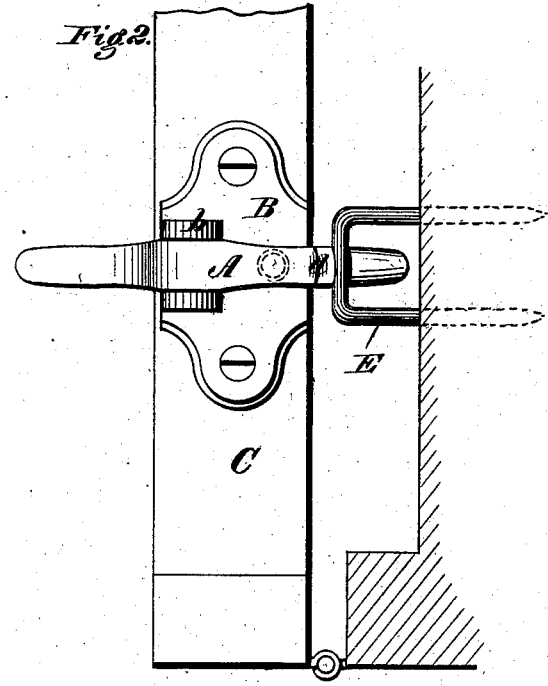
Witnesses:
Inventor:
Gideon Marshman.
By his attys.
Dodge & Son

UNITED STATES PATENT OFFICE.

GIDEON MARSHMAN, OF LYNN, MASSACHUSETTS.

IMPROVEMENT IN SHUTTER AND BLIND FASTENERS.

Specification forming part of Letters Patent No. 194,255, dated August 14, 1877; application filed June 28, 1877.

*To all whom it may concern:*

Be it known that I, GIDEON MARSHMAN, of Lynn, in the county of Essex and State of Massachusetts, have invented certain Improvements in Blind-Fasteners, of which the following is a specification:

My invention relates to that class of double-ended hook-fastenings which are employed on the lower ends of window-blinds for the purpose of holding them both open and shut; and the invention consists in constructing the same with a base-plate, having a socket cast thereon, for the several purposes of entering the blind and preventing the displacement of the device by the slamming of the blind, of permitting the use of a long and elastic spring which will not be liable to set or break, and of securing the spring in place without the use of rivets or other fastening devices, as hereinafter more fully described and claimed.

Figure 1 represents a transverse vertical section of a window-blind and my device thereon; Fig. 2, a bottom plan view of the same, but with the blind open instead of closed, as in the first figure.

A represents the double-ended hook, mounted near its middle on a horizontal pin, $a$, sustained by two depending studs, $b$, on the under side of a metal plate, B, which is secured to the under side of the bottom rail of the blind C. The ends of the hook are beveled or inclined, and provided with notches $c$, one on the upper and the other on the lower side, and behind each notch there is a projecting lip, $d$, to serve as a stop, and insure the proper and instantaneous engagement of the hook with the stirrups on which it takes hold. The action of the hook is caused by a spiral spring, D, bearing thereon, as shown. The spring bears at its lower end on a stud, $f$, formed on the hook, and at its upper end in a socket, $g$, cast in one piece with the plate B, and extending upward into the rail of the blind. The socket serves to hold the spring in position to permit the use of a long and elastic spring, in connection with the hook lying close to the plate, and to secure the plate against lateral displacement, and relieve its fastening-screws from the shock and strain which they would otherwise receive when the blind is swung violently open or shut.

The parts are so arranged that the pivotal movement of the hook is limited by its coming in contact with one side of the plate B, whereby it is prevented from being thrown out of position by the spring.

Instead of the devices usually employed for the hook to engage upon, I use U-shaped studs or stirrups E, as shown, the advantages of which are that they are cheap, strong, and readily applied, and, above all, that being open in the center where the hook engages, they will not, like the devices in common use, become covered or clogged by snow and ice in such manner as to prevent the hook from taking hold.

The stirrups E are made with flat or straight ends to receive the hook, and, when circumstances require, they are provided with base-plates by which to fasten them in place.

I am aware that double-ended hooks for securing blinds are old, and I make no claim thereto; but What I do claim is—

The blind-fastening consisting of the plate B, provided with the upwardly-extending socket $g$ and the downwardly-extending studs on its face, the double-ended pivoted hook A, and the spring D, seated in the socket and bearing on the hook, as shown.

GIDEON MARSHMAN. [L. S.]

Witnesses:
DEMPSTER MOORE,
E. Q. BACHELLER.